United States Patent Office 3,157,600
Patented Nov. 17, 1964

3,157,600
SYNTHETIC ESTER LUBRICANT CONTAINING A POLYESTER OF CHLORENDIC ACID
Howard J. Matson, Harvey, Ill., assignor, by mesne assignments, to Sinclair Research Inc., New York, N.Y., a corporation of Delaware
No Drawing. Filed Apr. 6, 1961, Ser. No. 101,086
4 Claims. (Cl. 252—54.6)

The present invention relates to reaction products useful as synthetic lubricant additives. Addition of the reaction products of the present invention to synthetic lubricants provides the lubricants with improved extreme pressure properties.

The products of the present invention are polyesters prepared by direct esterification of chlorendic acid and polyglycols or by an ester interchange between the ester of the chlorendic acid and the polyglycol. These reactions are conducted for a time sufficient to produce a product that is compatible, i.e., soluble, miscible or dispersible with the synthetic fluid to which it is added. Ordinarily the polyester additives are of lubricating viscosity, for instance, having a kinematic viscosity at 210° F. of about 500 to 300.000 centistokes. The reaction products of the present invention are added to synthetic lubricants in amounts sufficient to endow the lubricant with improved load carrying capacities particularly as measured by the Falex Extreme Pressure Test. Normally about 0.5 to 20 weight percent, preferably about 1 to 10 weight percent of the polyester is employed.

The polyglycols employed in preparing the polyesters can be illustrated by the structural formula

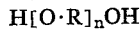

wherein R is a divalent aliphatic hydrocarbon radical of 3 to 12 carbon atoms, preferably 3 to 6 carbon atoms, straight or branched chain and $n=2$ to 50, preferably 2 to 10. The preferred glycols are the polypropylene glycols and particularly useful are those having average molecular weights from about 150 to 450. The glycol hydroxy radicals are preferably in the primary or terminal position but they can be otherwise placed in the molecule.

When the reaction products are made by an ester interchange reaction, the esters of the chlorendic acid are employed. The esters have the following structural formula:

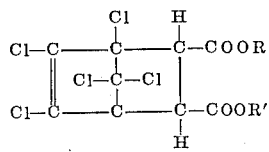

in which R and R' are lower alkyl radicals, i.e., of 1 to 5 carbon atoms, preferably 1 to 3 carbon atoms. The esters used are those of the chlorendic acid and the lower aliphatic alcohols so that the alcohol produced into the reaction will be volatilized under the reaction conditions.

In preparing the reaction products of the present invention, a molar ratio of 0.5 to 2.0 moles of chlorendic acid, its anhydride, or its ester per mole of the polyglycol is used. Preferably the molar ratio is 0.8 to 1.25:2, a particularly preferred ratio being about 1:1. When the esterification reaction is conducted between chlorendic acid and the polyglycol it is continued with concomitant boiling-off of water from the reaction mixture until the product has the desired viscosity. The temperature of this reaction is usually at least about 300° F. and should not be so high as to decompose the wanted product. If desired, the reaction can be conducted in the presence of a solvent, for instance an aromatic hydrocarbon such as xylene, and to provide a better reaction rate I prefer to employ an acid esterification catalyst. Many of these catalysts are known and include for instance hydrochloric acid, sulfuric acid, aliphatic and aromatic sulfonic acids, phosphoric acid, perchloric acid, hydrobromic acid, hydrofluoric acid and dihydroxyfluoboric acid. Other catalysts are thionyl chloride, boron trifluoride, silicon tetrafluoride, the chlorides of magnesium, aluminum, iron, zinc, copper and tin and salts of mercury, silver, cobalt, nickel and cerium. In the preferred reaction, when employing chlorendic acid, I use about 0.1 to 0.5 weight percent of paratoluene sulfonic acid catalyst, a xylene solvent and a temperature of about 345 to 390° F. while boiling-off water by refluxing.

When employing the esterification or ester interchange alcoholysis reaction between the chlorendic acid ester and the polyglycol, I prefer not to use a solvent and the temperature is generally above 350° F., but not so high as to decompose the wanted product. Advantageously, the temperature is in the range of about 435 to 480° F. Many ester exchange catalysts are known and include for instance, zinc stearate, aluminum stearate, dibutyltin oxide, titanium tetraesters of lower aliphatic alcohols, sodium acid sulfate, sulfuric, hydrochloric and sulfonic acids, aluminum alkoxides, sodium methyl carbonate. Also, these catalysts are exemplified by the alkali metal and alkaline earth metal alkoxides, hydroxides and carbonates.

In both the direct and ester interchange reactions the reaction is continued with concomitant boiling-off of water (direct esterification) or alcohol (ester interchange) from the reaction mixture until the polyester has a kinematic viscosity of at least about 500 centistokes at 210° F. The polymerization should not be continued for so long a period that a product insoluble in synthetic fluids results. The polyester additive preferably will have a viscosity of about 25,000 to 250,000 centistokes at 210° F. When the heating is stopped a "capping alcohol" can be added to the reaction mixture to tie up any remaining acid. Suitable "capping alcohols" are, for example, low molecular weight alkanols of up to about 20 carbon atoms, preferably the lower normal alkanols of 1 to 5 carbon atoms. Other materials such as alkylene oxides or polyalkylene oxides of a similar number of carbon atoms may be used instead of the alkanols.

The synthetic fluids to which the reaction products of the present invention are added are ester-based oils of lubricating viscosity and may be for instance, a simple ester or compounds having multiple ester groupings such as complex esters, polyesters, or diesters. These esters are made from mono- and polyhydroxy aliphatic alcohols and aliphatic carboxylic acids, frequently of about 4 to 12 carbon atoms; aliphatic including cycloaliphatic. The term alkanol is used to designate the mono- and polyhydroxy alcohols while the term alkane carboxylic acids denotes the mono- and polycarboxylic acids. The reaction product of a monohydroxy alcohol and a monocarboxylic acid is usually considered to be a simple ester. A diester is usually considered to be the reaction product of 1 mole of a carboxylic acid, say of 6 to 10 carbon atoms, with 2 moles of a monohydric alcohol or of 1 mole of a glycol of 4 to 10 carbon atoms with two moles of a monocarboxylic acid of 4 to 10 carbon atoms. The diesters frequently contain from 20 to 40 carbon atoms. One complex ester is of the type X—Y—Z—Y—X in which X represents a monohydric alcohol residue, Y represents a dicarboxylic acid residue and Z represents a glycol residue and the linkages are ester linkages. Those esters, wherein X represents a monoacid residue, Y represents a glycol residue and Z represents a dibasic acid residue are also considered to be complex esters. The complex esters often have 30 to 50 carbon atoms. Polyesters, or "polyester bright stocks" can be prepared by direct esterification of dibasic acids with glycols in about equimolar quantities. The polyesterification reaction is usually continued until the product has a kinematic viscosity from about 15 to 200 centistokes at 210° F., and preferably 40 to 130 centistokes at 210° F.

Although each of these products in itself is useful as a lubricant, they are particularly useful when added or blended with each other in synthetic lubricant compositions. These esters and blends have been found to be especially adaptable to the conditions to which turbine engines are exposed, since they can be formulated to give a desirable combination of high flash point, low pour point, and high viscosity at elevated temperatures, and need contain no additives which might leave a residue upon volatilization. In addition, many complex esters have shown good stability to shear. Natural esters, such as castor oil may also be included in the blends, as may be up to about 1 percent or more by weight of a foam inhibitor such as a methyl silicone polymer or other additives to provide a particular characteristic, for instance, extreme pressure or load carrying agents, corrosion inhibitors, etc., can be added.

Typical synthetic lubricants may be formulated essentially from a major amount (about 60–85%) of a complex ester and a minor amount (about 15–40%) of a diester, by stirring together a quantity of diester and complex ester at an elevated temperature, altering the proportions of each component until the desired viscosity is reached. Polyesters can be employed to thicken diester base stocks to increase the load carrying capacity of the base diester oil. The polyester will generally not comprise more than about 50 weight percent of the blend, preferably about 20 to 35 weight percent. Usually the amount of the polyester employed in any blend would be at least about 5 percent, and the majority of the lubricant is a diester. Other polymers such as Acryloids may be added as thickeners to the esters, generally the simple esters such as the above diesters, to obtain a base oil of desired viscosity. The Acryloids are polymers of mixed $C_4$ to $C_{18}$ esters of methacrylic acid having 10,000 to 20,000 molecular weight. Advantageously the final lubricating oil composition would have a maximum viscosity at —40° F. of about 13,000 centistokes and a minimum viscosity of about 7.5 centistokes at 210° F.

The monohydric alcohols employed in these esters usually contain less than about 20 carbon atoms and are generally aliphatic. Preferably the alcohol contains up to about 12 carbon atoms. Useful aliphatic alcohols include butyl, hexyl, methyl, iso-octyl and dodecyl alcohols, $C_{13}$ oxo and octadecyl alcohols. $C_8$ to $C_{10}$ branched chain primary alcohols are frequently used to improve the low temperature viscosity of the finished lubricant composition. Alcohols such as n-decanol, 2-ethylhexanol, "oxo" alcohols, prepared by the reaction of carbon monoxide and hydrogen upon the olefins obtainable from petroleum products such as diisobutylene and $C_7$ olefins, ether alcohols such as butyl Carbitol, tripropylene glycol mono-isopropyl ether, dipropylene glycol mono-isopropyl ether, and products such as "Tergitol 3A3," which has the formula $$C_{13}H_{27}O(CH_2CH_2O)_3H,$$

are suitable alcohols for use to produce the desired lubricant. If the alcohol has no hydrogens on the beta carbon atoms, it is neo-structured; and esters of such alcohols are often preferred. In particular, the neo-$C_8$ alcohol—2,2,4 - trimethyl-pentanol-1—gives lubricating diesters or complex esters suitable for blending with diesters to produce lubricants which meet stringent viscosity requirements, Iso-octanol and isodecanol are alcohol mixtures made by the oxo process from $C_3$–$C_4$ copolymer heptenes. The cut which makes up iso-octanol usually contains about 17% 3,4-dimethylhexanol; 29% 3,5-dimethylhexanol; 25% 4,5-dimethylhexanol; 1.4% 5,5-dimethylhexanol; 16% of a mixture of 3-methylheptanol and 5-ethylheptanol; 2.3% 4-ethylhexanol; 4.3% α-alkyl alkanols and 5% other materials.

Generally, the glycols contain from about 4 to 12 carbon atoms; however, if desired they could contain a greater number. Among the specific glycols which can be employed are 2-ethyl-1,3-hexandiol, 2-propyl-3,3-heptanediol, 2-methyl-1,3-pentanediol, 2-butyl-1,3-butanediol, 2,4-diphenyl-1,3-butanediol, and 2,4-dimesityl-1,3-butanediol. In addition to these glycols, other glycols may be used, for instance, where the alkylene radical contains 2 to 4 carbon atoms such as diethylene glycol, dipropylene glycol and other glycols up to 1000 to 2000 molecular weight. The most popular glycols for the manufacture of ester lubricants appear to be polypropylene glycols having a molecular weight of about 100–300 and 2-ethyl hexanediol. The 2,2-dimethyl glycols, such as neopentyl glycol have been shown to impart heat stability to the final blends. Minor amounts of other glycols or other materials can be present as long as the desired properties of the product are not unduly deleteriously affected.

Aside from glycols, the esters may be made from polyhydric alcohols of more than two hydroxyl groups, e.g., tri- and tetrahydroxy aliphatic alcohols having about 4 to 12 carbon atoms, preferably about 5 to 8 carbon atoms; for instance pentaerythritol, trimethylolpropane and the like. Particularly suitable ester base oils are formed when these alcohols are reacted with monocarboxylic acids having about 4 to 12 carbon atoms, preferably 4 to 9 carbon atoms. It is preferred that the reaction be conducted so as to substantially completely esterify the acids.

One group of monocarboxylic acids includes those of 8 to 24 carbon atoms such as stearic, lauric, etc. The carboxylic acids employed in making ester lubricants will often contain from about 4 to 12 carbon atoms. Suitable acids are described in U.S. Patent No. 2,575,195 and include the aliphatic dibasic acids of branched or straight chain structures which are saturated or unsaturated. The preferred acids are the saturated aliphatic carboxylic acids containing not more than about 12 carbon atoms, and mixtures of these acids. Such acids include succinic, adipic, suberic, azelaic and sebacic acids and "isosebacic" acid which is a mixture of α-ethyl suberic acid, α,α'-diethyl adipic acid and sebacic acid. This composite of acids is attractive from the viewpoint of economy and availability since it is made from petroleum hydrocarbons rather than the natural oils and fats which are used in the manufacture of many other dicarboxylic acids, which natural oils and fats are frequently in short supply. The preferred dibasic acids are sebacic and azelaic or mixtures thereof. Minor amounts of adipic used with a major amount of sebacic may also be used with advantage.

Various useful ester base oils are disclosed in U.S. Patents Nos. 2,499,983; 2,499,984; 2,575,195; 2,575,196; 2,703,811; 2,705,724 and 2,723,286. Generally, the synthetic base oils consist essentially of carbon, hydrogen and oxygen, i.e., the essential nuclear chemical structure is formed by these elements alone. However, these oils may be substituted with other elements such as halogens, e.g., chlorine and fluorine. Some representative components of ester lubricants are ethyl palmitate, ethyl stearate, di-(2-ethylhexyl) sebacate, ethylene glycol dilaurate, di-(2-ethylhexyl) phthalate, di-(1,3-methyl butyl) adipate, di-(2-ethyl butyl) adipate, di-(1-ethyl propyl) adipate, diethyl oxylate, glycerol tri-n-octoate, di-cyclohexyl adipate, di-(undecyl) sebacate, tetraethylene glycol di-(2-ethylene hexoate), di-Cellosolve phthalate, butyl phthallyl butyl glycolate, di-n-hexyl fumarate polymer, dibenzyl sebacate, and diethylene glycol bis (2-n-butoxy ethyl carbonate). 2-ethylhexyl-adipate-neopentyl glycyl-adipate-2-ethylhexyl, is a representative complex ester. Generally, these synthetic ester lubricants have a viscosity ranging from light to heavy oils, e.g., about 50 SUS at 100° F. to 250 SUS at 210° F., and preferably 30 to 150 SUS at 210° F.

The esters are manufactured, in general, by mere reaction of the alcoholic and acidic constituents, although simple esters may be converted to longer chain components by transesterification. The constituents, in the proportions suitable for giving the desired ester, are reacted preferably in the presence of a catalyst and solvent or water entraining agent to insure maintenance of the liquid state during the reaction. Aromatic hydrocarbons such as xylene or toluene have proven satisfactory as solvents. The choice of solvent influences the choice of temperature at which the esterification is conducted; for instance, when toluene is used, a temperature of 140° C. is recommended; with xylene, temperatures up to about 195° C. may be used. To provide a better reaction rate an acid esterification catalyst is often used. Many of these catalysts are known and include, for instance, HCl, $H_2SO_4$, $NaHSO_4$, aliphatic and aromatic sulfonic acids, phosphoric acid, hydrobromic acid, HF and dihydroxyfluoboric acid. Other catalysts are thionyl chloride, boron trifluoride and silicon tetrafluoride. Titanium esters also make valuable esterification and transesterification catalysts.

In a preferred reaction, about 0.5 to about 1 weight percent, or advantageously, 0.2 to 0.5% of the catalyst is used with a xylene solvent at a temperature of 165 to 200° C. while refluxing water. The temperatures of the reaction must be sufficient to remove the water from the esterification mass as it is formed. This temperature is usually at least about 140° C. but not so high as to decompose the wanted product. The highest temperature needed for the reaction will probably be about 200° C., preferably not over about 175° C. The pressure is conveniently about atmospheric. Although reduced pressure or superatmospheric pressure could be utilized, there is usually no necessity to use reduced pressures, as the temperatures required at atmospheric pressure to remove the water formed do not usually unduly degrade the product.

When reacting glycols with dibasic acids to produce a polyester, it is preferred to continue the reaction with concomitant boiling off of water from the reaction mixture until the polyester product has a kinematic viscosity of about 15 to 200 centistokes at 210° F., preferably about 40 to 130 centistokes. When this point has been reached, the polymerization can be stopped, for instance, by adding a "capping alcohol" to the reaction mixture, and continuing to reflux until water ceases to be evolved. The capping alcohol is a low molecular weight monoalcohol of up to about 20 carbon atoms. It is standard practice, when esters are made using the conventional acid catalyst such as sodium bisulfate or paratoluenesulfonic acid to give the esters an after-treat by washing the ester with a 5 percent aqueous $K_2CO_3$ solution or by heating the ester in an autoclave for 15 hours at 340 to 350° F. with 10 weight percent of propylene oxide. It is also conventional to subject the ester to filtration to remove insoluble materials. After this the product may be subjected to a reduced pressure distillation or stripping at 100° to 200° C. to remove volatile materials, such as water, the solvent and light ends.

If desired, other additives may be added to the synthetic lubricant compositions of the present invention to improve other characteristics of the lubricant so long as they do not deleteriously affect the functional properties of the composition. Such additives are for instance, antioxidants, viscosity index improvers, corrosion inhibitors, other extreme pressure agents etc.

The following examples are included to further illustrate the reaction products of the present invention and the properties of lubricants containing them but are not to be considered limiting.

EXAMPLE I 150 grams of polypropylene glycol having an average molecular weight of about 150 were diluted with 100 ml. of toluene solvent in a 1 liter 3 neck flask equipped with water trap and condenser, stirrer and thermowell. The solution was heated to 80° C., then 389 grams of chlorendic acid (1 mol.) were added slowly and with constant stirring. After about 2 hours' reflux at 130° C. pot, 18 ml. of water were collected overhead, indicating about 50% reaction. No further reaction was obtained by increasing the pot temperature to 160° C., neither was the addition of 1.5 grams of $NaHSO_4$ effective. Upon the addition of 1.5 grams of p-toluene sulfonic acid however, an additional 14 ml. of water were collected in about 2 hours. In order to react the excess glycol, 40 grams (0.2 mole) sebacic acid were added and reflux continued for three hours. 78 grams (0.6 mole) of 2-ethylhexanol were then added to react the excess acid, and reflux continued for four hours. A total of 43 ml. of water were collected in all of these steps, equal to 100% of theory based on the acid components. The solvent and excess alcohol were removed by vacuum stripping to 170° C. pot temperature. The recovered product was designated Product C and analyzed 36.0% chlorine (theoretical 35% based on dilution).

Oil blends of Plexol 201–J (di-2-ethyl-hexylsebacate) and various concentrations of the polyester of Example I were prepared and tested for load carrying ability in the Falex lubricant testing apparatus and the SAE Extreme Pressure Testing Machine. Plexol 201–J without the polyester was also tested. The results are shown in Table I below.

For comparative purposes the various concentrations of the diesters of Examples II to V below in Plexol 201–J were also tested.

EXAMPLE II

Dibutyl chlorendate was prepared by refluxing 371 grams (1 mole) of chlorendic anhydride, 300 grams of n-butyl alcohol (4 moles) and 2.5 grams of p-toluene sulfonic acid, until the theoretical amount of water (18 ml.) had been collected in a water trap. The excess water was then removed under vacuum to a pot temperature of 150° C. The product was designated Product D and analyzed 42% chlorine (theoretical 42.5%).

EXAMPLE III

This product was prepared from dry lauryl alcohol and chlorendic anhydride, using para toluene sulfonic acid as a catalyst. Toluene was used to entrain water of reaction. After theoretical water had been derived from the reaction, butyl alcohol was added and the reaction continued. The final product was washed with dilute NaOH and water and topped to 150° C./11 mm. The product was designated Product H and analyzed 27.8% chlorine (theoretical 29.4).

EXAMPLE IV

This product was prepared in a similar manner, reacting chlorendic anhydride with polyethylene glycol chloride (average M.W. 210). It was topped to 150° C./15 mm. The product was designated Product I and analyzed 37.2% chlorine (theoretical 38.7).

EXAMPLE V

This product was prepared by reacting sebacic acid with polyethylene glycol chloride (average M.W. 210). It was topped to 150° C./10 mm. The product was designated J and analyzed 10.9% chlorine (12.1% theoretical).

The results of the tests on oil blends containing the products of Examples II to V are also shown in Table I below.

Table I

| Additive | Reactants | Viscosity, cst. at 210° F. | | Conc., percent [b] | Falex (lbs.) | | SAE Safe Load (lbs.) |
|---|---|---|---|---|---|---|---|
| | | Actual | Extrap. [a] | | Pass | Fail | |
| None | | | | 0.5 | 1,250 | 1,500 | 108 |
| C | Polypropylene glycol + chlorendic acid | 1,755 | 100,000–200,000 | 2.0 | 2,500 | 2,750 | 389 |
| | | | | 5.0 | 3,750 | 4,000 | 464 |
| | | | | 10 | 4,500+ | None | 450+ |
| | | | | | 4,500+ | | 600+ |
| D | Butyl alcohol + chlorendic acid | 8 | 8 | 0.5 | 1,500 | 1,750 | 328 |
| | | | | 2.0 | 1,500 | 1,750 | 386 |
| | | | | 3.0 | | | 436 |
| H | Lauryl alcohol + chlorendic acid | 11 | 11 | 0.5 | 1,250 | 1,500 | 363 |
| | | | | 2.0 | 1,250 | 1,500 | 385 |
| I | Polyethylene glycol chloride + chlorendic acid | 25 | 28 | 0.5 | 1,750 | 2,000 | 341 |
| | | | | 2.0 | 2,000 | 2,250 | 456 |
| J | Polyethylene glycol chloride + sebacic acid | 9 | 9 | 0.5 | 1,000 | 1,250 | 311 |
| | | | | 2.0 | 1,250 | 1,500 | 345 |

[a] Actual Viscosity—with esters C and I there was unreacted acid and viscosity was on this product and extrapolated for ester viscosity.
[b] In Plexol 201-J which is di-2-ethyl hexyl sebacate + sebacic acid (free).

The data of Table I demonstrates the improved load carrying capacity of synthetic lubricants containing the polyesters of the present invention when compared to the load carrying capacities of the synthetic oil alone. With respect to the other diesters tested the results show that while in some cases the SAE load value of lubricants containing these additives is comparable to the SAE load values provided by the additives of the present invention, the Falex test values are far inferior.

I claim:

1. A lubricant composition consisting essentially of a synthetic ester lubricant, said synthetic ester lubricant being of an alkanol of 4 to 12 carbon atoms and an alkane carboxylic acid of 4 to 12 carbon atoms and a minor amount sufficient to improve load carrying capacities of said fluid of a base oil-compatible polyester reaction product of a material selected from the group consisting of chlorendic acid and chlorendic acid ester wherein said ester group is a lower alkyl radical of 1 to 5 carbon atoms, and a polyglycol having the structural formula:

$$H[O \cdot R]_n OH$$

wherein R is a divalent aliphatic hydrocarbon radical of 3 to 12 carbon atoms and $n=2$ to 50, the molar ratio of said selected material to said polyglycol reacted being about 0.5 to 2.0:1.

2. The composition of claim 1 wherein the polyglycol is polypropylene glycol.

3. The composition of claim 1 wherein the amount of polyester reaction product is about 0.5 to 20 weight percent.

4. A lubricant composition consisting essentially of an ester-based synthetic fluid of lubricating viscosity, said ester-based fluid being of an alkanol of 4 to 12 carbon atoms and an alkane carboxylic acid of 4 to 12 carbon atoms and about 0.5 to 20 weight percent of a base oil-compatible polyester reaction product of chlorendic acid and a polyglycol having the structural formula:

$$H[O \cdot R]_n OH$$

wherein R is a divalent aliphatic hydrocarbon radical of 3 to 6 carbon atoms and $n=2$ to 10, the molar ratio of chlorendic acid to said polyglycol reacted being about 0.5 to 2.0:1.

References Cited in the file of this patent

UNITED STATES PATENTS

| 2,733,248 | Lidov | Jan. 31, 1956 |
| 2,771,423 | Dorinson | Nov. 20, 1956 |
| 2,971,913 | David et al. | Feb. 14, 1961 |

OTHER REFERENCES

HET Acid, Bulletin No. 40, Hooker Electrochemical Co., revised July 1954, pages 1 to 13 pertinent.